J. F. DERHAMMER.
LUBRICATOR FOR STEAM ENGINES.
APPLICATION FILED APR. 13, 1914.
1,135,164.
Patented Apr. 13, 1915.
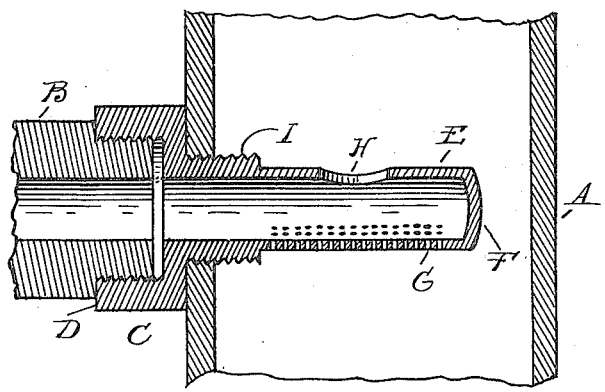
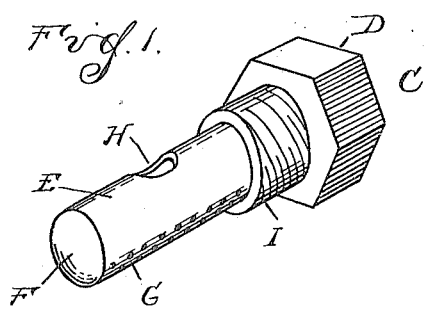
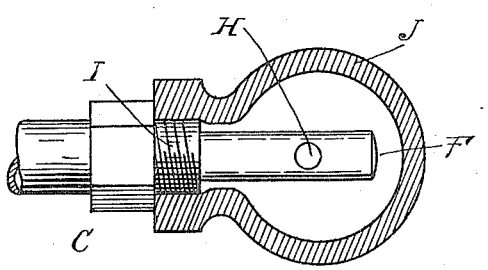
WITNESSES:
INVENTOR
Joseph F. Derhammer
BY
Whittemore Hulbert & Whittemore
ATTORNEYS

UNITED STATES PATENT OFFICE.

JOSEPH F. DERHAMMER, OF DETROIT, MICHIGAN.

LUBRICATOR FOR STEAM-ENGINES.

1,135,164.  Specification of Letters Patent. Patented Apr. 13, 1915.

Application filed April 13, 1914. Serial No. 831,439.

*To all whom it may concern:*

Be it known that I, JOSEPH F. DERHAMMER, a citizen of the United States of America, residing at Detroit, in the county of Wayne and State of Michigan, have invented certain new and useful Improvements in Lubricators for Steam-Engines, of which the following is a specification, reference being had therein to the accompanying drawings.

It is the object of the invention to provide a simple construction of lubricator attachable to the steam conduit of a steam engine or other steam-operated mechanism, and which will cause the effective atomization of the lubricant so as to carry the same in suspension by the steam.

In the drawings: Figure 1 is a perspective view of the attachment; Fig. 2 is a section through a steam conduit to which the attachment is applied; and Fig. 3 is a horizontal section showing a slight modification.

A is a steam conduit of any suitable construction, B is the discharge nipple of a lubricant-containing cup or receptacle (not shown), and C is my improved attachment which comprises a head portion D recessed and threaded for engagement with the nipple B, and a tubular shank E adapted for insertion transversely into the conduit A. This tubular portion E is provided with a closed end F and with a series of fine perforations G distributed along its lower portion. There is also an aperture H at the top for permitting access of the steam to the space within the tube.

I is a threaded portion of the tube which is adapted to engage a threaded aperture in the conduit A or any suitable threaded fitting in said conduit.

With the construction as described in use, to apply the attachment it is merely necessary to bore and tap a suitable hole in the conduit A, or to connect into said conduit a suitable fitting such as J, as shown in Fig. 3, and to engage the attachment C therewith. When in position the aperture H will be on the side from which the steam is traveling, and the perforations G upon the opposite side. Thus the pressure produced by the movement of the steam column acting upon the oil within the tube F, as well as the reduction of pressure produced by the passage of the steam around said tube will cause the discharge of fine jets of the lubricant into the moving column. This will so finely divide or atomize the oil that it will be carried in suspension by the steam and will be distributed to the parts to be lubricated.

What I claim as my invention is:—

1. A lubricator, comprising a tube laterally insertible in a steam conduit and adapted for connection with a lubricant supply, the lower portion of said tube being provided with fine jet apertures and the upper portion with an aperture for admission of steam pressure to operate on the surface of the lubricant within said tube, said portions extending transversely of the steam conduit.

2. In a lubricator, a tube adapted for insertion laterally in a steam conduit and adapted for connection with an external source of lubricant supply, the lower portion of said tube being provided with a series of fine perforations distributed along the length thereof, and the upper portion being provided with a central aperture for the admission of steam pressure to operate on the surface of the lubricant in said tube.

3. A lubricator, comprising a tube having a closed inner end adapted for insertion laterally in a steam conduit and having a threaded portion for engagement with the wall of said conduit and an external portion for connection with a source of lubricant supply, the inner portion of said tube being provided with a series of fine perforations distributed along its under side and having a central aperture on its upper side for admission of steam pressure.

4. A lubricator, comprising an attachment having a polygonal head and a tubular shank closed at its inner end, said shank being provided with a threaded portion for engagement with a threaded aperture in the wall of the steam conduit and having a series of fine perforations on its under side, with a central aperture on its upper side, for the purpose described.

5. A lubricating attachment for steam conduits, comprising a tubular member closed at one end having a threaded portion adjacent to the opposite end, an enlarged and polygonal head recessed and threaded for connection with a source of lubricant supply, said tubular portion being provided with a series of fine perforations on its under side and a larger aperture on its upper side for the purpose described.

In testimony whereof I affix my signature in presence of two witnesses.

JOSEPH F. DERHAMMER.

Witnesses:
W. J. BELKNAP,
JAMES P. BARRY.

Copies of this patent may be obtained for five cents each, by addressing the "Commissioner of Patents, Washington, D. C."